United States Patent
Kalandyk et al.

(10) Patent No.: US 11,620,148 B2
(45) Date of Patent: Apr. 4, 2023

(54) COLLECTING CAPACITY DATA OF VIRTUAL MACHINES BY LEVERAGING AGENT DATA

(71) Applicant: INTERNATIONAL BUSINESS MACHINES CORPORATION, Armonk, NY (US)

(72) Inventors: Piotr Kalandyk, Zielonki (PL); Michal Maciej Zalas, Cracow (PL); Pawel Tadeusz Januszek, Cracow (PL); Grzegorz Piotr Szczepanik, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 16/800,914

(22) Filed: Feb. 25, 2020

(65) Prior Publication Data
US 2021/0263758 A1    Aug. 26, 2021

(51) Int. Cl.
G06F 9/455    (2018.01)
G06F 21/10    (2013.01)
G06F 9/50    (2006.01)

(52) U.S. Cl.
CPC ........ *G06F 9/45558* (2013.01); *G06F 9/5083* (2013.01); *G06F 21/105* (2013.01); *G06F 2009/4557* (2013.01)

(58) Field of Classification Search
CPC ............... G06F 9/45558; G06F 21/105; G06F 2009/4557
See application file for complete search history.

(56) References Cited

U.S. PATENT DOCUMENTS

| | | | |
|---|---|---|---|
| 9,195,585 B2 | 11/2015 | Phelan et al. | |
| 9,632,812 B1* | 4/2017 | Gritter | ............... H04L 67/1095 |
| 2008/0134175 A1 | 6/2008 | Fitzgerald et al. | |
| 2010/0083251 A1 | 4/2010 | Mccrory et al. | |
| 2012/0144391 A1 | 6/2012 | Ueda | |
| 2017/0339018 A1* | 11/2017 | Prabhu | ............... H04L 41/0893 |
| 2018/0253261 A1* | 9/2018 | Kripalani | ............. G06F 3/0659 |
| 2020/0065127 A1* | 2/2020 | Kim | .................... G06F 11/3476 |

OTHER PUBLICATIONS

IBM Corp., "Managing VM Managers", [online], [Retrieved on Aug. 28, 2019], Retrieved from the Internet at <URL: https://www.ibm.com/support/knowledgecenter/SSKLLW_9.5.0/eos?origURL=SSKLLW_9.5.0/com.ibm.bigfix.inventory.doc/Inventory/admin/t_managing_virtual_machine.html>, 3 pp.

* cited by examiner

*Primary Examiner* — Jacob D Dascomb
(74) *Attorney, Agent, or Firm* — Konrad Raynes Davda & Victor LLP; Janaki K. Davda

(57) ABSTRACT

Provided are techniques for collecting capacity data of virtual machines by leveraging agent data. A list of one or more virtual machines for which capacity data is to be retrieved is obtain from an asset server, where the one or more virtual machines are identified using a licensing measurement. Infrastructure data and hypervisor data are obtained from an infrastructure server. For each of the one or more virtual machines, the infrastructure data and the hypervisor data are used to request, from a capacity scanner on each of the one or more virtual machines, capacity data for that virtual machine. The capacity data for each of the one or more virtual machines is sent to the asset server, and the asset server performs load balancing of software that is to be executed on the one or more virtual machines using the capacity data.

18 Claims, 6 Drawing Sheets

COLLECTING CAPACITY DATA OF VIRTUAL MACHINES BY LEVERAGING AGENT DATA

BACKGROUND

Embodiments of the invention relate to collecting capacity data of virtual machines by leveraging agent data.

In some systems, a tool is used to scan all managed virtual machines by a hypervisor. A hypervisor may be described as a monitor (e.g., computer software, firmware or hardware) that creates and runs virtual machines. Capacity data is not available on the virtual machine level. Because of this, the tool collects the capacity data of all of the virtual machines and matches the capacity data with specific virtual machines afterwards.

The tool also collects data for virtual machines and their servers, even if not needed, and this adds data processing overhead and may create some vulnerabilities.

SUMMARY

In accordance with certain embodiments, a computer-implemented method is provided for collecting capacity data of virtual machines by leveraging agent data. The computer-implemented method comprises operations. A list of one or more virtual machines for which capacity data is to be retrieved is obtain from an asset server, where the one or more virtual machines are identified using a licensing measurement. Infrastructure data and hypervisor data are obtained from an infrastructure server. For each of the one or more virtual machines, the infrastructure data and the hypervisor data are used to request, from a capacity scanner on each of the one or more virtual machines, capacity data for that virtual machine. The capacity data for each of the one or more virtual machines is sent to the asset server, and the asset server performs load balancing of software that is to be executed on the one or more virtual machines using the capacity data.

In accordance with other embodiments, a computer program product is provided for collecting capacity data of virtual machines by leveraging agent data. The computer program product comprises a computer readable storage medium having program code embodied therewith, the program code executable by at least one processor to perform operations. A list of one or more virtual machines for which capacity data is to be retrieved is obtain from an asset server, where the one or more virtual machines are identified using a licensing measurement. Infrastructure data and hypervisor data are obtained from an infrastructure server. For each of the one or more virtual machines, the infrastructure data and the hypervisor data are used to request, from a capacity scanner on each of the one or more virtual machines, capacity data for that virtual machine. The capacity data for each of the one or more virtual machines is sent to the asset server, and the asset server performs load balancing of software that is to be executed on the one or more virtual machines using the capacity data.

In accordance with yet other embodiments, a computer system is provided for collecting capacity data of virtual machines by leveraging agent data. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A list of one or more virtual machines for which capacity data is to be retrieved is obtain from an asset server, where the one or more virtual machines are identified using a licensing measurement. Infrastructure data and hypervisor data are obtained from an infrastructure server. For each of the one or more virtual machines, the infrastructure data and the hypervisor data are used to request, from a capacity scanner on each of the one or more virtual machines, capacity data for that virtual machine. The capacity data for each of the one or more virtual machines is sent to the asset server, and the asset server performs load balancing of software that is to be executed on the one or more virtual machines using the capacity data.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments use data about virtual machines to narrow down and limit the scan process to specific virtual machines (e.g., if there are 10 virtual machines, embodiments identify and scan 3 virtual machines). The virtual machines are identified by Unique Universal Identifiers (UUIDs), and embodiments use the UUIDs (obtained by agents) to limit which hypervisor server hosts are to be accessed for capacity data about virtual machines at those hypervisor server hosts.

Figure 1:
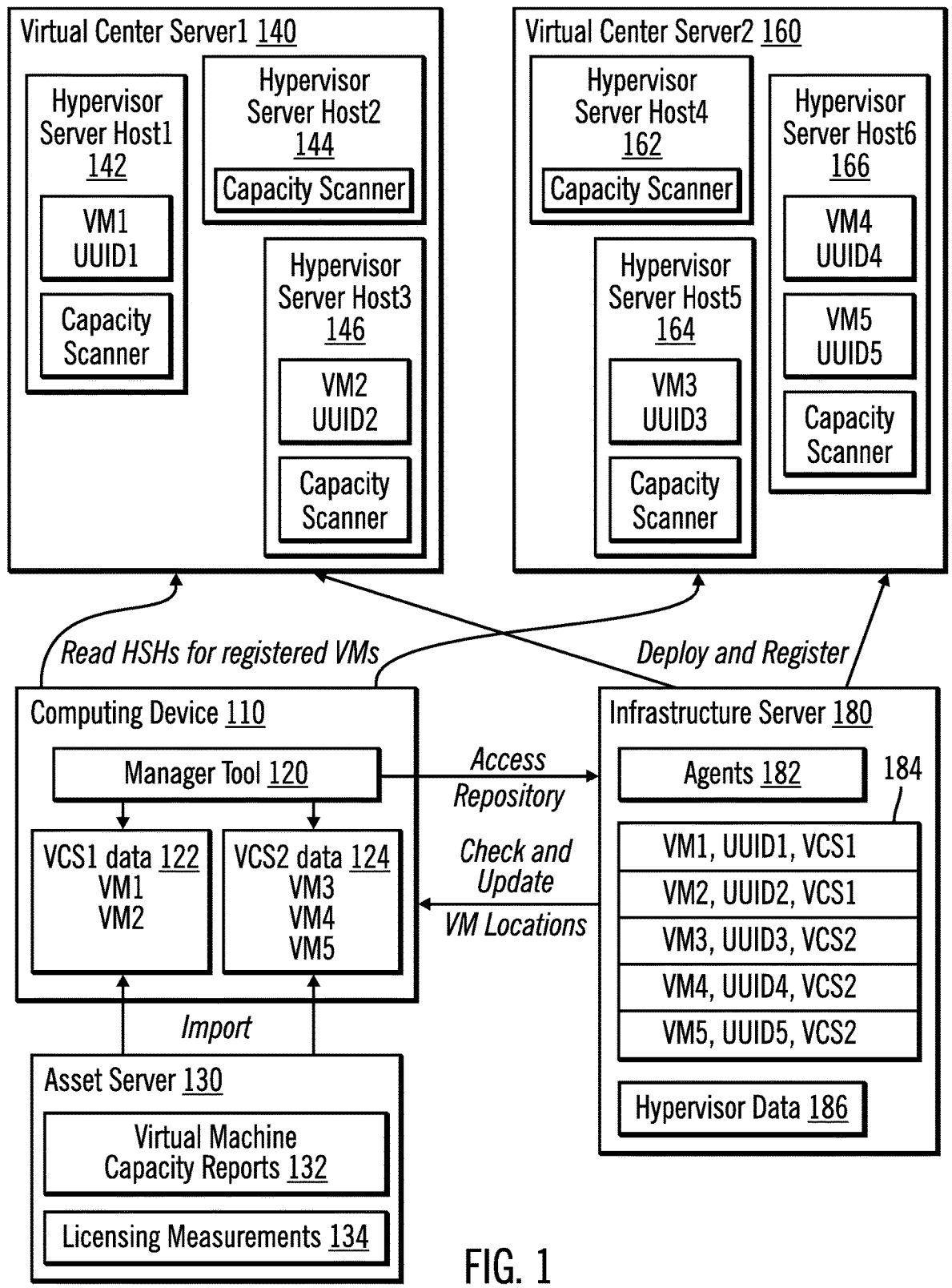
FIG. 1 illustrates, in a block diagram, a computing environment in accordance with certain embodiments.

FIG. 1 illustrates, in a block diagram, a computing environment in accordance with certain embodiments. A computing device 110 includes a manager tool 120. In certain embodiments, the manager tool 120 is a virtual machine management tool. The computing device 110 is coupled to an asset server 130, a virtual center server1 140 (VCS1), a virtual center server2 160 (VCS2), and an infrastructure server 180.

The asset server 130 stores virtual machine capacity reports 132 and licensing measurements 134. The virtual machine capacity reports 132 include virtual machine UUIDs and capacities of the virtual machines provided by the manager tool 120. A licensing measurement 134 may be associated with a customer and identifies the virtual machines that are licensed by that customer. Each licensing measurement 134 (e.g., a Processor Value Unit (PVU)) may be described as a unit of measure used to differentiate licensing of software on distributed processor technologies. Distributed processor technologies may be defined by processor vendor, brand, type, and model number. In certain embodiments, the asset server 130 determines the licensing measurements 134 using data regarding a number of sockets, physical processors (e.g., Central Processing Units (CPUs)) of the hypervisor server hosts 142, 144, 146, 162, 164, 166 where each virtual machine is deployed, and a class of the processor (with regard to scalability).

The manager tool 120 imports information about the virtual machines in the virtual center servers 140, 160 from the virtual machine capacity reports 132, and the information is stored as virtual center server1 (VCS1) data 122 and virtual center server2 (VCS2) data 124. In certain embodiments, the manager tool 120 obtains current capacity data for the virtual machines, updates the virtual center server1 (VCS1) data 122 and the virtual center server2 (VCS2) data 124, and sends the current capacity data to the asset server 130 for updating the virtual machine capacity reports 132.

The virtual center server1 140 includes a hypervisor server host1 (HSH1) 142, a hypervisor server host2 (HSH2) 144, and a hypervisor server host3 (HSH3) 146. The hypervisor server host1 (HSH1) 142 includes a virtual machine (VM1) having identifier UUID1 and a capacity scanner. The hypervisor server host2 (HSH2) 144 does not currently include any virtual machines, but does include a capacity scanner. The hypervisor server host3 (HSH3) 146 includes a virtual machine (VM2) having identifier UUID2 and a capacity scanner.

The virtual center server2 160 includes a hypervisor server host4 (HSH4) 162, hypervisor server host5 (HSH5) 164, and a hypervisor server host6 (HSH6) 166. The hypervisor server host4 (HSH4) 162 does not currently include any virtual machines, but does include a capacity scanner. The hypervisor server host5 (HSH5) 164 includes a virtual machine (VM3) having identifier UUID3 and a capacity scanner. The hypervisor server host6 (HSH6) 166 includes a virtual machine (VM4) with identifier UUID4, another virtual machine (VM5) with identifier UUID5, and a capacity scanner.

Each virtual center server 140, 160 may be described as unifying resources from individual hypervisor server hosts 142, 144, 146, 162, 164, 166 so that those resources may be shared among virtual machines. Each virtual center server 140, 160 manages the assignment of the virtual machines to the hypervisor server hosts 142, 144, 146, 162, 164, 166 and manages the assignment of resources to the virtual machines within a given hypervisor server host 142, 144, 146, 162, 164, 166 (e.g., based on policies).

The infrastructure server 180 includes agents 182, infrastructure data 184, and hypervisor data 186. The infrastructure server 180 is coupled to the virtual center servers 140, 160.

In certain embodiments, the virtual machines are registered with the infrastructure server 180 (e.g., by a system administrator or other user), and the agents 182 are deployed on the virtual machines to identify the virtual center servers for those virtual machines. That is, the agents 182 are deployed on the virtual machines to collect infrastructure data 184 (e.g., a UUID of a virtual machine and an indicator of which virtual center server 140, 160 is the location of that virtual machine) from the virtual center servers 140, 160, and the agents 182 store the information as infrastructure data 184. The infrastructure data 184 includes, for each virtual machine, a UUID and an indicator of which virtual center server 140, 160 is the location of that virtual machine.

The manager tool 120 accesses the infrastructure server 180 to collect the infrastructure data 184 gathered by the agents, which were deployed on the virtual machines. In this manner, the manager tool 120 obtains the UUIDs of the virtual machines.

In addition, the hypervisor data 186 is registered with the infrastructure server 180 (e.g., by the system administrator or other user). Each of the hypervisor server hosts 142, 144, 146, 162, 164, 166 has hypervisor data that includes an Internet Protocol (IP), a hostname, credentials, a connection method, a port used, etc., and this data is stored as hypervisor data 186.

A capacity scanner executes inside each of the virtual machines and obtains the current UUID for the virtual machine for a later capacity scan. The manager tool 120 obtains the UUID of each of the virtual machines from the infrastructure data 184, obtains the hypervisor data 186, and uses the UUID and hypervisor data 186 to request specific capacity data for one or more virtual machines from the capacity scanners. The capacity scanner receives the UUIDs of one or more virtual machines, identifies the capacity of the one or more virtual machines, and returns the capacity to the manager tool 120. The capacity data of each of the virtual machines may be changing over time, and embodiments provide current capacity data.

In certain embodiments, during deployment of virtual machine software that runs multiple operating systems of different virtual machines over a single physical hypervisor host server, a system administrator (or other user) or deployment system provides information about the virtual center servers 140, 160 and virtual machines deployed on those virtual center servers 140, 160. Once the virtual machine is registered to the infrastructure server 180, the UUID of that virtual machine is collected by an agent 182.

In certain embodiments, the manager tool 120 verifies whether the UUID is correct. If the UUID is incorrect (i.e., empty or duplicated), the system administrator (or other user) is notified with a request to fix the error before the virtual machine is registered successfully in the infrastructure server 180. In certain embodiments, for verified UUIDS, the infrastructure server 180 determines whether it already has information about the virtual center server 140, 160 where the virtual machine is deployed, and, if not, the infrastructure server 180 asks the system administrator (or other user) to provide the information about the virtual center server 140, 160.

For verification, the manager tool 120 sends a request to known virtual center servers 140, 160, in sequence (i.e., one at a time), to confirm whether particular UUIDs of virtual machines are registered there. If not registered at one virtual center server 140, 160, the manager tool sends request to other known virtual center servers 140, 160 to confirm whether particular UUIDs of virtual machines are registered there. If still no match, the manager tool 120 asks the system administrator (or other user) to expand the list of virtual center server connections to cover the virtual center server 140, 160 where the particular virtual machine was migrated.

Embodiments perform scanning of managed virtual machines by a hypervisor server host 142, 144, 146, 162,

164, 166. This includes the manager tool 120 receiving information about the virtual machines in each virtual center 140, 160 during deployment of the virtual machines in the hypervisor server hosts 142, 144, 146, 162, 164, 166.

Embodiments register the virtual machines in an infrastructure server 180 and collect the universally unique identifier UUID of each virtual machine.

In certain embodiments, the manager tool 120 verifies the UUID, and the system administrator (or other user) is notified if the UUID is incorrect to enable correction of the UUID before the virtual machine is registered by the infrastructure server 180.

Embodiments use the infrastructure server 180 to check information about the virtual center where the virtual machine is deployed, and, if that information is not available, the system administrator (or other user) is notified to input the information about the virtual center (e.g., a virtual center link). In particular, the manager tool 120 sends requests to the known virtual centers to confirm whether the particular UUID is registered there, and, if no virtual center confirms the UUID, the manager tool 120 notifies the system administrator (or other user) to expand the list of virtual centers where the virtual machine was migrated.

Figure 2:
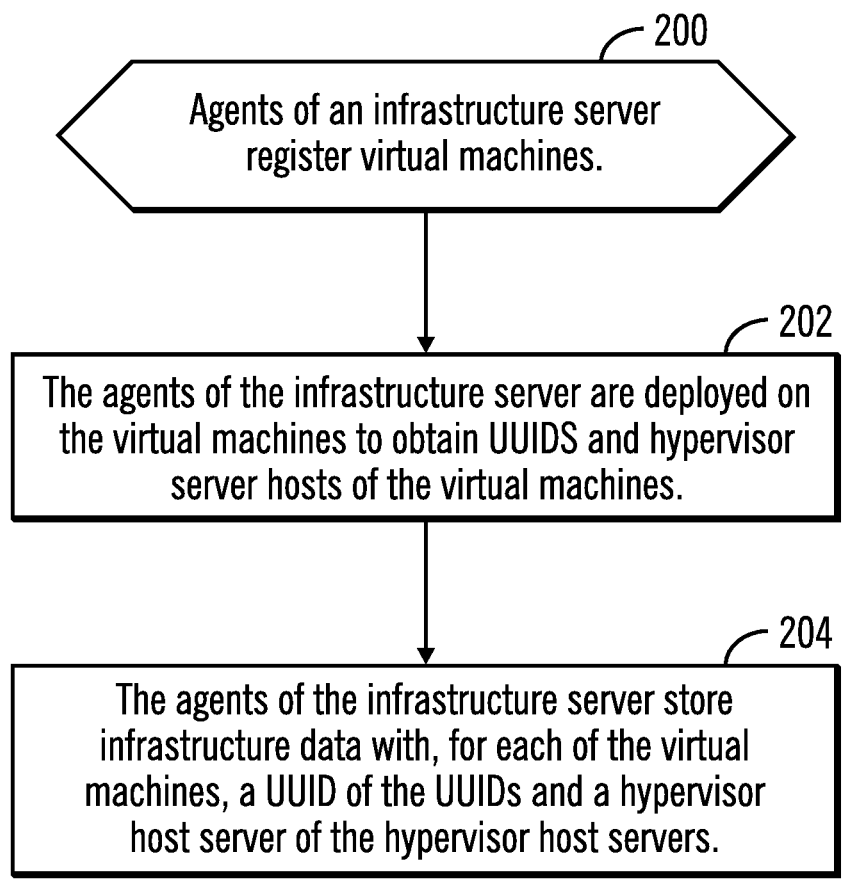
FIG. 2 illustrates, in a flowchart, operations of agents of an infrastructure server in accordance with certain embodiments.

FIG. 2 illustrates, in a flowchart, operations of agents 182 of the infrastructure server 800 in accordance with certain embodiments. Control begins at block 200 with the agents 182 of the infrastructure server 180 registering the virtual machines (e.g., in response to input from a system administrator (or other user) requesting that the virtual machines be registered). In block 202, the agents 182 of the infrastructure server 180 are deployed on the virtual machines to obtain UUIDS and hypervisor server hosts of the virtual machines. In block 204, the agents 182 of the infrastructure server 180 store infrastructure data 184 with, for each of the virtual machines, a UUID of the UUIDs and a hypervisor host server of the hypervisor host servers.

Figure 3:
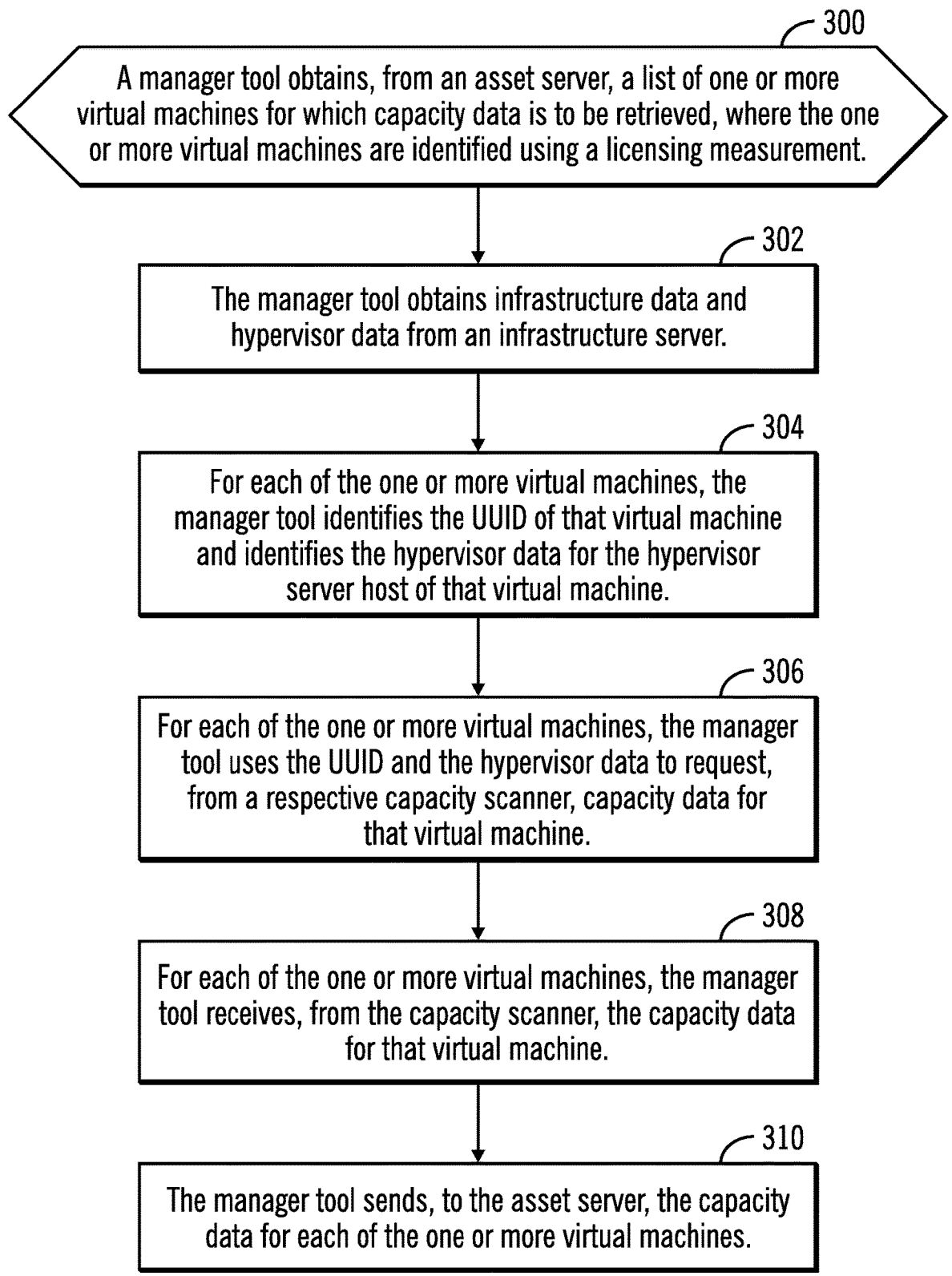
FIG. 3 illustrates, in a flowchart, operations of a manager tool for collecting capacity data of virtual machines by leveraging agent data in accordance with certain embodiments.

FIG. 3 illustrates, in a flowchart, operations of the manager tool 120 for collecting capacity data of virtual machines by leveraging agent data in accordance with certain embodiments. Control begins at block 300 with the manager tool 120 obtaining, from an asset server 130, a list of one or more virtual machines for which capacity data is to be retrieved, where the one or more virtual machines are identified using a licensing measurement 134. In certain embodiments, the list of one or more virtual machines is for a specific customer who is licensed to use the one or more virtual machines. That is, the list of one or more virtual machines is based on the licensing measurement 134, which is associated with a customer and identifies the virtual machines that are licensed by that customer.

In block 302, the manager tool 120 obtains infrastructure 184 and hypervisor data 186 from the infrastructure server 180. In block 304, for each of the one or more virtual machines, the manager tool 120 identifies the UUID of that virtual machine and identifies the hypervisor data for the hypervisor server host 142, 144, 146, 162, 164, 166 of that virtual machine. For example, the manager tool 120 selects a virtual machine VM3 that is on the list of one or more virtual machines. Then, the manager tool 120 identifies UUID3 for the virtual machine VM3 in the infrastructure data. In addition, the manager tool 120 identifies hypervisor server host5 (HSH5) 164 in the infrastructure data and identifies hypervisor data for hypervisor server host5 (HSH5) 164. Next, the manager tool 120 uses UUID3 and the hypervisor data for hypervisor server host5 (HSH5) 164 to access the virtual machine VM3 and obtain the capacity data from the capacity scanner.

In block 306, for each of the one or more virtual machines the manager tool 120 uses the UUID and the hypervisor data to request, from the respective capacity scanner, capacity data for that virtual machine. In block 308, for each of the one or more virtual machines, the manager tool 120 receives, from the capacity scanner, the capacity data for that virtual machine. The manager tool 120 may update the virtual center server1 (VCS1) data 122 and the virtual center server2 (VCS2) data 124. In block 310, the manager tool 120 sends, to the asset server 130, the capacity data for each of the one or more virtual machines. The asset server 130 may update the virtual machine capacity reports 132 for use in load balancing.

Figure 4:
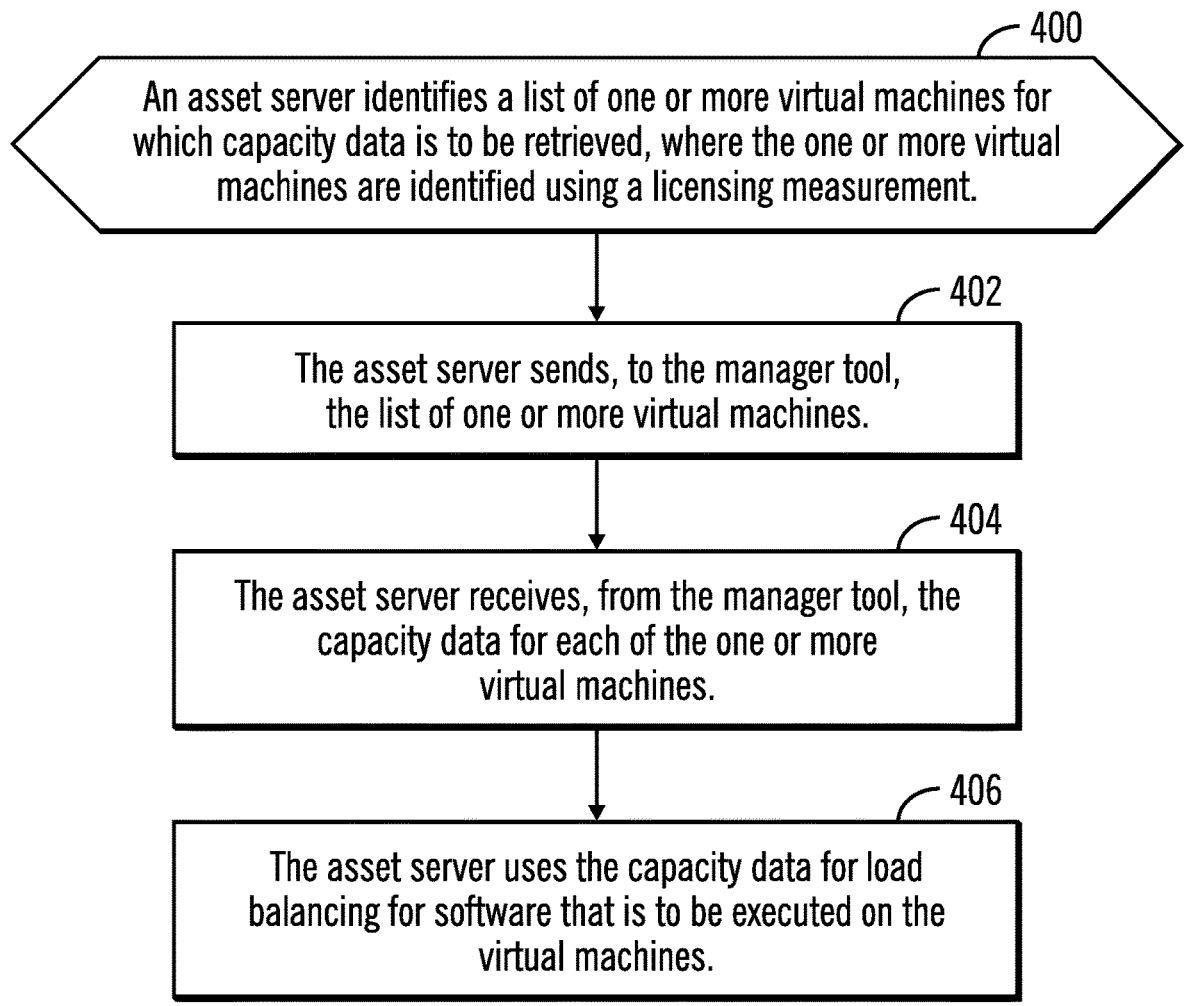
FIG. 4 illustrates, in a flowchart, operations by an asset server in accordance with certain embodiments.

FIG. 4 illustrates, in a flowchart, operations by an asset server 130 in accordance with certain embodiments. Control begins at block 400 with the asset server 130 identifying a list of one or more virtual machines for which capacity data is to be retrieved, where the one or more virtual machines are identified using a licensing measurement 134. In certain embodiments, the list of one or more virtual machines is for a specific customer who is licensed to use the one or more virtual machines. In block 402, the asset server 130 sends, to the manager tool 120, the list of one or more virtual machines. In block 404, the asset server 130 receives, from the manager tool, the capacity data for each of the one or more virtual machines. In block 406, the asset server 130 uses the capacity data for load balancing for software that is to be executed on the virtual machines. In certain embodiments, the software for a specific customer is load balanced on the virtual machines for which the specific customer has obtained licenses as identified by the licensing measurement 134. The asset server 130 may update the virtual machine capacity reports 132 with the capacity data.

Figure 5:
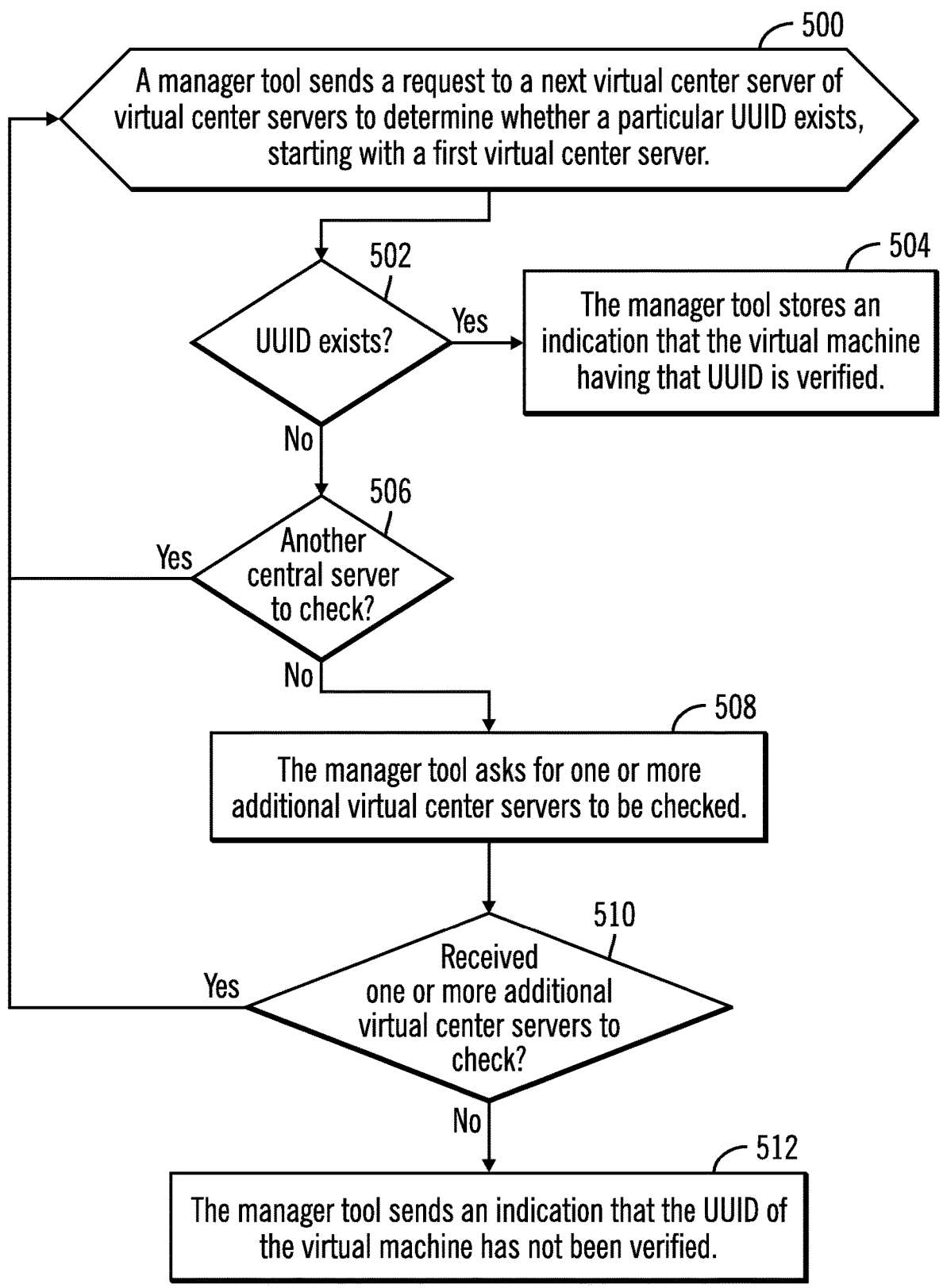
FIG. 5 illustrates, in a flowchart, operations for verifying a Unique Universal Identifier (UUID) of a virtual machine in accordance with certain embodiments.

FIG. 5 illustrates, in a flowchart, operations for verifying a UUID of a virtual machine in accordance with certain embodiments. In certain embodiments, the manager tool 120 verifies the UUID before the virtual machine completes registration with the infrastructure server 180. In certain embodiments, the manager tool 120 verifies the UUID of each virtual machine for which capacity information is to be retrieved.

Control begins at block 500 with the manager tool 120 sending a request to a next virtual center server of virtual center servers to determine whether a particular UUID exists, starting with a first virtual center server. In block 502, the manager tool 12-determines whether the UUID exists. If so, processing continues to block 504, otherwise, processing continues to block 506.

In block 504, the manager tool 120 stores an indication that the virtual machine having that UUID is verified. In block 506, the manager tool 120 determines whether there is another virtual center server to check. If so, processing continues to block 500, otherwise, processing continues to block 508.

In block 508, the manager tool 120 asks (e.g., a system administrator or other user) for one or more additional virtual center servers to be checked. In block 510, the manager tool 120 determines whether the one or more additional virtual center servers to check were received. If so, processing continues to block 500, otherwise, processing continues to block 512. In block 512, the manager tool 120 sends an indication that the UUID of the virtual machine has not been verified.

In this manner, the UUID is verified by checking one or more of a plurality of virtual center servers.

Embodiments reduce data processing overhead and avoid vulnerabilities of conventional systems. With embodiments, instead of having the asset server 130 collect data about all of the virtual machines on a particular host, collect all virtual machine UUIDs during a scan process, and then match collected data to identify each hypervisor server host 142, 144, 146, 162, 164, 166 and its capacity allocation for each virtual machine, embodiments are able to collect data for specified virtual machines. In addition, embodiments avoid the problems of virtual machine UUIDs being set incorrectly or not being set at all during virtual machine deployment, lack of information which virtual center server 140, 16 that each virtual machine is running on, retrieving data about all virtual machines deployed on the hypervisor server hosts 142, 144, 146, 162, 164, 166 (and so avoids the time, processor use, and network traffic used to retrieve data about all of the virtual machines). Also, embodiments are more efficient as they avoid retrieve data that is not useful (e.g., because a single virtual machine is to be matched with a specific hypervisor server host 142, 144, 146, 162, 164, 166.

Figure 6:
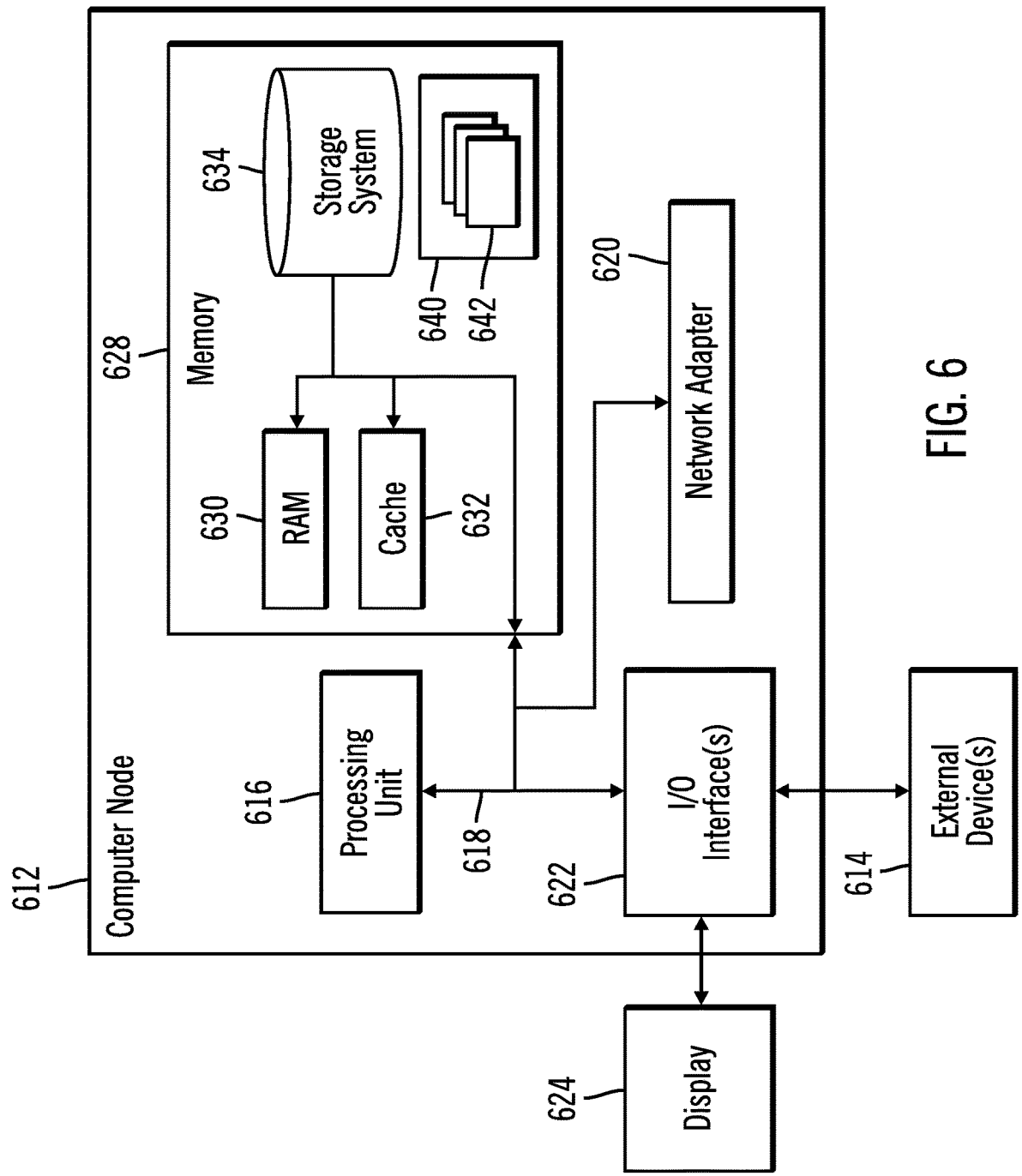
FIG. 6 illustrates a computing environment in accordance with certain embodiments.

FIG. 6 illustrates a computing environment in accordance with certain embodiments. Referring to FIG. 6, computer system 612 is only one example of a suitable computing system and is not intended to suggest any limitation as to the scope of use or functionality of embodiments of the invention described herein. Regardless, computer system 612 is capable of being implemented and/or performing any of the functionality set forth hereinabove.

The computer system 612 may be a computer system, which is operational with numerous other general purpose or special purpose computing system environments or configurations. Examples of well-known computing systems, environments, and/or configurations that may be suitable for use with computer system 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 612 may be described in the general context of computer system executable instructions, such as program modules, being executed by a computer system. Generally, program modules may include routines, programs, objects, components, logic, data structures, and so on that perform particular tasks or implement particular abstract data types. Computer system 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 612 is shown in the form of a general-purpose computing device. The components of computer system 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 612 typically includes a variety of computer system readable media. Such media may be any available media that is accessible by computer system 612, and it includes both volatile and non-volatile media, removable and non-removable media.

System memory 628 can include computer system readable media in the form of volatile memory, such as random access memory (RAM) 630 and/or cache memory 632. Computer system 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system 612 may also communicate with one or more external devices 614 such as a keyboard, a pointing device, a display 624, etc.; one or more devices that enable a user to interact with computer system 612; and/or any devices (e.g., network card, modem, etc.) that enable computer system 612 to communicate with one or more other computing devices. Such communication can occur via Input/Output (I/O) interfaces 622. Still yet, computer system 612 can communicate with one or more networks such as a local area network (LAN), a general wide area network (WAN), and/or a public network (e.g., the Internet) via network adapter 620. As depicted, network adapter 620 communicates with the other components of computer system 612 via bus 618. It should be understood that although not shown, other hardware and/or software components could be used in conjunction with computer system 612. Examples, include, but are not limited to: microcode, device drivers, redundant processing units, external disk drive arrays, RAID systems, tape drives, and data archival storage systems, etc.

In certain embodiments, the computing device 110, the asset server 130, each hypervisor server host 142, 144, 146, 162, 164, 166, and the infrastructure server 180 has the architecture of computer system 612. In certain embodiments, additional, specialized hardware (e.g., Graphics Processing Unit (GPU) or Field Programmable Gate Array (FPGA)) may be included in the architecture of computer system 612.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   obtaining, from an asset server, a list of one or more virtual machines for which capacity data is to be retrieved, wherein the one or more virtual machines are identified using a licensing measurement;
   obtaining infrastructure data and hypervisor data from an infrastructure server;
   for each of the one or more virtual machines, using the infrastructure data and the hypervisor data to obtain, from a capacity scanner on each of the one or more virtual machines, the capacity data for that virtual machine by:
      selecting a virtual machine of the one or more virtual machines;
      identifying a Unique Universal Identifier (UUID) for the virtual machine in the infrastructure data;
      identifying a hypervisor server host for the virtual machine having the UUID;
      identifying the hypervisor data for the hypervisor server host; and
      using the UUID and the hypervisor data for the hypervisor server host to access the virtual machine and obtain the capacity data from the capacity scanner on the hypervisor server host; and
   sending, to the asset server, the capacity data for each of the one or more virtual machines, wherein the asset server performs load balancing of software that is to be executed on the one or more virtual machines using the capacity data.

2. The computer-implemented method of claim 1, wherein one or more agents of the infrastructure server are deployed on the virtual machines to obtain the infrastructure data.

3. The computer-implemented method of claim 1, wherein the infrastructure data includes, for each virtual machine of the virtual machines, the UUID of that virtual machine and an indicator of which virtual center server is a location of that virtual machine.

4. The computer-implemented method of claim 3, wherein the UUID is verified by checking one or more of a plurality of virtual center servers.

5. The computer-implemented method of claim 1, wherein the licensing measurement is associated with a customer and identifies the one or more virtual machines that are licensed by that customer.

6. The computer-implemented method of claim 5, wherein the virtual machines are registered on the infrastructure server.

7. A computer program product, the computer program product comprising a computer readable storage medium having program code embodied therewith, the program code executable by at least one processor to perform operations for:
   obtaining, from an asset server, a list of one or more virtual machines for which capacity data is to be retrieved, wherein the one or more virtual machines are identified using a licensing measurement;
   obtaining infrastructure data and hypervisor data from an infrastructure server;
   for each of the one or more virtual machines, using the infrastructure data and the hypervisor data to obtain, from a capacity scanner on each of the one or more virtual machines, the capacity data for that virtual machine by:
      selecting a virtual machine of the one or more virtual machines;
      identifying a Unique Universal Identifier (UUID) for the virtual machine in the infrastructure data;
      identifying a hypervisor server host for the virtual machine having the UUID;
      identifying the hypervisor data for the hypervisor server host; and
      using the UUID and the hypervisor data for the hypervisor server host to access the virtual machine and obtain the capacity data from the capacity scanner on the hypervisor server host; and
   sending, to the asset server, the capacity data for each of the one or more virtual machines, wherein the asset server performs load balancing of software that is to be executed on the one or more virtual machines using the capacity data.

8. The computer program product of claim 7, wherein one or more agents of the infrastructure server are deployed on the virtual machines to obtain the infrastructure data.

9. The computer program product of claim 7, wherein the infrastructure data includes, for each virtual machine of the virtual machines, the UUID of that virtual machine and an indicator of which virtual center server is a location of that virtual machine.

10. The computer program product of claim 9, wherein the UUID is verified by checking one or more of a plurality of virtual center servers.

11. The computer program product of claim 7, wherein the licensing measurement is associated with a customer and identifies the one or more virtual machines that are licensed by that customer.

12. The computer program product of claim 11, wherein the virtual machines are registered on the infrastructure server.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
obtaining, from an asset server, a list of one or more virtual machines for which capacity data is to be retrieved, wherein the one or more virtual machines are identified using a licensing measurement;
obtaining infrastructure data and hypervisor data from an infrastructure server;
for each of the one or more virtual machines, using the infrastructure data and the hypervisor data to obtain, from a capacity scanner on each of the one or more virtual machines, the capacity data for that virtual machine by:
selecting a virtual machine of the one or more virtual machines;
identifying a Unique Universal Identifier (UUID) for the virtual machine in the infrastructure data;
identifying a hypervisor server host for the virtual machine having the UUID;
identifying the hypervisor data for the hypervisor server host; and
using the UUID and the hypervisor data for the hypervisor server host to access the virtual machine and obtain the capacity data from the capacity scanner on the hypervisor server host; and
sending, to the asset server, the capacity data for each of the one or more virtual machines, wherein the asset server performs load balancing of software that is to be executed on the one or more virtual machines using the capacity data.

14. The computer system of claim 13, wherein one or more agents of the infrastructure server are deployed on the virtual machines to obtain the infrastructure data.

15. The computer system of claim 13, wherein the infrastructure data includes, for each virtual machine of the virtual machines, the UUID of that virtual machine and an indicator of which virtual center server is a location of that virtual machine.

16. The computer system of claim 15, wherein the UUID is verified by checking one or more of a plurality of virtual center servers.

17. The computer system of claim 13, wherein the licensing measurement is associated with a customer and identifies the one or more virtual machines that are licensed by that customer.

18. The computer system of claim 17, wherein the virtual machines are registered on the infrastructure server.

* * * * *